B. A. FISKE.
APPARATUS FOR LOCALIZING SUBMERGED SUBMARINES.
APPLICATION FILED MAY 23, 1917.
1,293,744.
Patented Feb. 11, 1919.
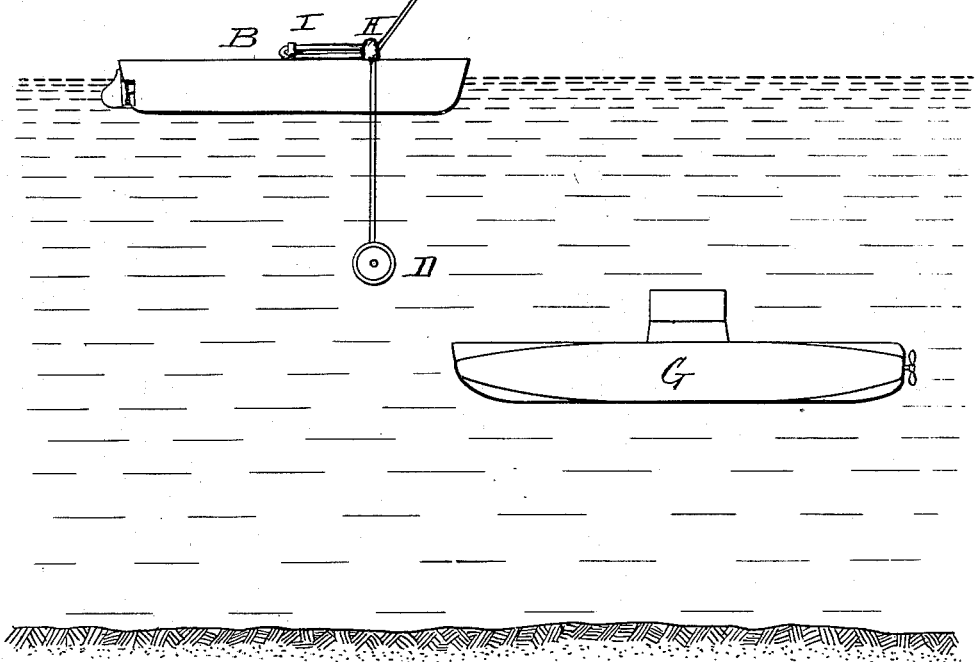

UNITED STATES PATENT OFFICE.

BRADLEY A. FISKE, OF THE UNITED STATES NAVY.

APPARATUS FOR LOCALIZING SUBMERGED SUBMARINES.

1,293,744.　　　　　Specification of Letters Patent.　　Patented Feb. 11, 1919.

Application filed May 23, 1917. Serial No. 170,360.

*To all whom it may concern:*

Be it known that I, BRADLEY A. FISKE, of the United States Navy, a citizen of the United States, residing at New York, in the county of New York and State of New York, have invented a certain new and useful Improvement in Apparatus for Localizing Submerged Submarines, of which the following is a specification.

The invention has for its object the localization of a submarine boat by causing said boat telephonically to signal its presence to an observer in a mobile air vessel and consists in the apparatus more particularly hereinafter set forth.

In the accompanying drawings—

Figure 1 is a general view of the device wherein my method is carried into effect.

Fig. 2 illustrates the mode of recognizing the direction of movement of a detected submarine.

Similar letters of reference indicate like parts.

A is an air vessel—preferably an air-ship, as here shown,—it being understood that an aeroplane of any suitable form may also be used. B is a surface boat which is to be towed by the air ship A by means of the rope or cable C. Suspended from the boat is a microphone D connected by circuit wires carried by cable C to a battery E and telephone receiver F in the car of the air-ship A. G is a submerged submarine.

The operation is as follows: When a submarine is under water, power is supplied from her storage battery to an electric motor, whereby the submarine is driven. The continuous whirring sound made by the motor while in operation transmitted through the water affects the microphone D, so that said sound is heard and recognized in the telephone receiver F by an observer in the air-ship car listening thereat.

Being thus apprised of the location of the submarine, said observer may transmit that information to a station ashore, or to a vessel afloat, by any known means—as, for example, by visible signals or by radio-telegraphy.

In order to enable the observer to convey information as to the speed and direction of the submarine, the sea area to be protected may be mapped in divisions of predetermined area, as 1, 2, 3, etc., of Fig. 2. The observer knowing, for example, that he is over division 5 and hearing the submarine noise in his telephone, signals that fact to an observer at some central station. Afterward, being over division 3, if he still hears the sound, he communicates that further fact. The central station observer thus becomes informed that the position of the submarine is first in division 5, for example, shown at $a$, Fig. 2, and that its course is to a position as $b$ in division 3, and, therefore, northeasterly, while the time elapsing between the signals will show approximately the speed of the submarine in going from position $a$ to position $b$.

The boat B may be simply a float in boat shape, or it may be an armed motor boat with crew on board. In the latter case, as soon as the observer in the air-ship signals to said crew, the detection of a submarine sound, the cable may be detached from the boat, leaving the microphone suspended from the cable, and the boat free to watch for and attack the submarine, or to give warning to other vessels in the vicinity. Any suitable means of release may be provided: As here shown, the bight of the cable is taken through an opening in a bit H and engaged over a bit I, from which it can be lifted and let go.

By means of the float or boat B, I can maintain the microphone at a definite depth below the surface of the water, which, of course, would not be the case if it were suspended directly from the air-ship. If the boat B be a power boat, the engine is stopped during the towing to prevent the sound thereof from also affecting the microphone.

By noting where the sounds in the telephone become louder or fainter, and by steering in such a direction that the sounds become louder or remain in the same intensity, the observer in the air-ship can move in a direction and at a speed approximately that of the submarine.

I claim:

1. An apparatus for localizing a submerged submarine, comprising a mobile air-vessel, a metallic circuit supported thereby, and, in said circuit, a submerged microphone, a surface vessel wherefrom said submerged microphone is suspended, and means on said air-vessel for reproducing underwater sounds affecting said microphone.

2. An apparatus as in claim 1, further comprising a towing cable connecting said air-vessel to said surface vessel.

3. An apparatus as in claim 2, further comprising the said metallic circuit supported on said cable.

4. An apparatus as in claim 1, the said surface vessel being a power boat.

5. An apparatus as in claim 4, the said towing cable being releasable from said boat by an operator on said boat.

In testimony whereof I have affixed my signature in presence of two witnesses.

BRADLEY A. FISKE.

Witnesses:
 GERTRUDE T. PORTER,
 MAY T. McGARRY.